United States Patent
Savaris et al.

(10) Patent No.: US 12,309,878 B1
(45) Date of Patent: May 20, 2025

(54) ELECTRONIC DEVICE IDENTIFICATION USING EMITTED ELECTROMAGNETIC SIGNALS

(71) Applicant: Ubiety Technologies, Inc., Chicago, IL (US)

(72) Inventors: Augusto Savaris, Chicago, IL (US); Joseph Loftus, Seattle, WA (US); Michael B. Cox, Chicago, IL (US); Keith Puckett, Chicago, IL (US)

(73) Assignee: Ubiety Technologies, Inc., Chicago, IL (US)

( * ) Notice: Subject to any disclaimer, the term of this patent is extended or adjusted under 35 U.S.C. 154(b) by 0 days.

(21) Appl. No.: 18/750,866

(22) Filed: Jun. 21, 2024

(51) Int. Cl.
| | |
|---|---|
| *H04W 12/00* | (2021.01) |
| *H04W 8/00* | (2009.01) |
| *H04W 12/79* | (2021.01) |
| *H04W 24/02* | (2009.01) |
| *H04W 84/12* | (2009.01) |

(52) U.S. Cl.
CPC ......... *H04W 8/005* (2013.01); *H04W 12/009* (2019.01); *H04W 12/79* (2021.01); *H04W 24/02* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 10,109,166 B1 | 10/2018 | Selinger et al. | |
| 10,304,303 B2 | 5/2019 | Selinger et al. | |
| 10,382,282 B1 | 8/2019 | Levy-Yurista | |
| 11,671,829 B1 * | 6/2023 | Radhakrishnan | ... H04L 63/0823 713/156 |
| 11,792,455 B1 | 10/2023 | Fu | |
| 11,831,701 B1 * | 11/2023 | Zhang | ..................... H04L 65/80 |
| 12,177,692 B1 * | 12/2024 | Savaris | ..................... H04L 43/12 |
| 2013/0128311 A1 | 5/2013 | Kim | |
| 2014/0046711 A1 | 2/2014 | Borodow | |
| 2014/0320908 A1 * | 10/2014 | Iwauchi | ................... H04L 45/24 358/1.15 |
| 2015/0036881 A1 * | 2/2015 | Sharma | ................. G06F 18/285 382/103 |

(Continued)

FOREIGN PATENT DOCUMENTS

| | | | | |
|---|---|---|---|---|
| EP | 4178160 B1 * | 2/2024 | .......... | H04L 61/106 |

OTHER PUBLICATIONS

A Study on Device Identification from BLE Advertising Packets with Randomized MAC Addresses Akiyama et al. (Year: 2021), 4 pgs.

*Primary Examiner* — Kenny S Lin

(74) *Attorney, Agent, or Firm* — Perkins Coie LLP

(57) ABSTRACT

Machine learning-based methods are disclosed to identify the types of electronic devices present in an area using emitted passive electromagnetic signals (e.g., RF signals such as Bluetooth, WiFi, and/or cellular). The identification of the electronic devices improves private and public security in determining human presence and device presence. The disclosed methods use trained machine learning models that learn the relationship between the metadata present within the broadcast electromagnetic signals and the types of electronic devices present. The disclosed methods, apparatuses and systems can include use of several wireless data transfer protocols, such as Wi-Fi, Bluetooth and cellular.

20 Claims, 8 Drawing Sheets

(56) References Cited

U.S. PATENT DOCUMENTS

| | | |
|---|---|---|
| 2017/0223754 A1 | 8/2017 | Li |
| 2019/0268730 A1* | 8/2019 | Jung ........................ H04W 4/08 |
| 2019/0349426 A1* | 11/2019 | Smith ................... H04L 9/3239 |
| 2020/0045647 A1 | 2/2020 | Gupta |
| 2020/0238991 A1* | 7/2020 | Aragon ................ G05B 13/027 |
| 2021/0136178 A1* | 5/2021 | Casey ..................... H04L 47/83 |
| 2022/0051548 A1 | 2/2022 | Pellegrini |
| 2023/0316726 A1 | 10/2023 | Selinger et al. |
| 2023/0351873 A1 | 11/2023 | Vazirani |

* cited by examiner

ELECTRONIC DEVICE IDENTIFICATION USING EMITTED ELECTROMAGNETIC SIGNALS

BACKGROUND

Traditional home and business security systems often lack a reliable way to quickly and easily assess the presence of people in a house or business, leading to high false-alarm rates, account churn, and low customer satisfaction. Motion and magnetic sensors are inadequate to identify details of intruders. Moreover, video surveillance can be invasive, expensive, as well as misidentify intruders. Mobile devices regularly broadcast electromagnetic signals in order to advertise their presence and actively discover access points in proximity. Such electromagnetic signals can include unique identifiers, such as the MAC address of mobile devices, and may also include a list of preferred networks accessed by these devices in the past. However, the emitted electromagnetic signals are typically complex and can contain many different fields of data, some of which may be incomplete. Therefore, traditional methods for detecting electronic devices based on electromagnetic signals are typically inadequate.

BRIEF DESCRIPTION OF THE DRAWINGS

Detailed descriptions of implementations of the present technology will be described and explained through the use of the accompanying drawings.

Figure 1:
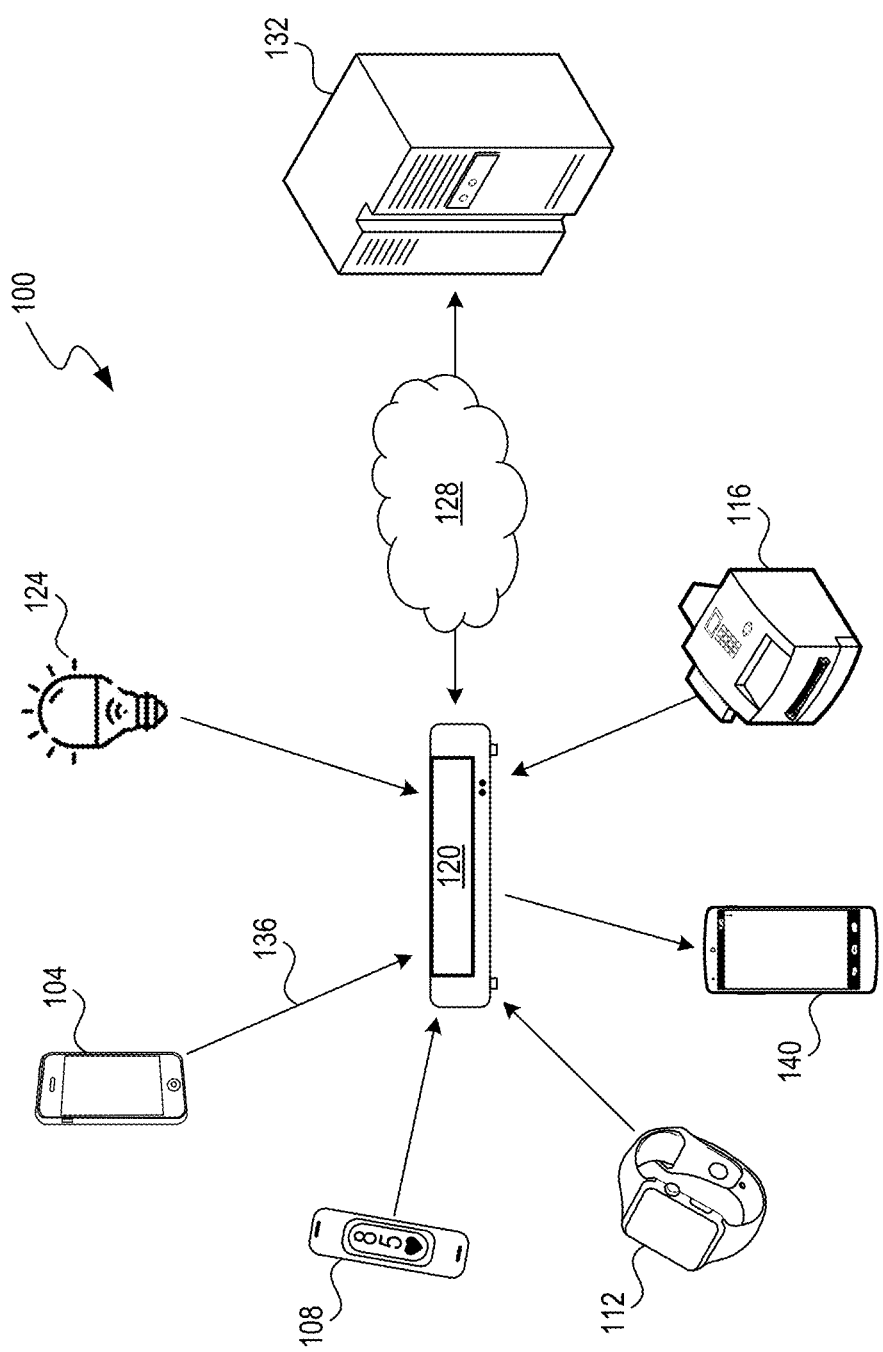
FIG. 1 is a block diagram that illustrates an example system that can implement aspects of the present technology.

The technologies described herein will become more apparent to those skilled in the art from studying the Detailed Description in conjunction with the drawings. Embodiments or implementations are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

This document discloses methods, systems, and apparatuses for improved detection of electronic device presence. The disclosed apparatuses listen for electronic device activity across a spectrum of frequency ranges. Using the disclosed systems, sensed device activity covers Wi-Fi signaling, cellular signaling, Bluetooth signaling, network discovery, and Wi-Fi fingerprinting. By listening for active as well as passive signals emitted by devices, the disclosed apparatuses collect pseudonymous attributes and identifiers from devices and networks. The disclosed methods augment device detection with context determined through artificial intelligence (AI) using both real-world and synthetically-generated data to expand anomaly detection and overall understanding of presence. The radio frequency signals detected are transformed using AI into valuable insights and actionable data. Moreover, the disclosed cloud infrastructure is architected to process raw data and scale in real-time. The cloud infrastructure provides a backbone to the presence detection ecosystem, translating raw data to insights at high levels of reliability, efficiency, and accuracy.

In addition, the disclosed data ecosystem is enriched with multiple insights and scenarios to enhance precision using the collected signal data. In some implementations, the data ecosystem is enriched with insights synthetically using a synthetic data generation platform, which can simulate multiple scenarios, equipping the data platform to process highly probable as well as improbable situations with accuracy. Synthetic data generation may be used with respect to pre-release devices and/or devices for which ground-truth (actual) data may be unavailable. The disclosed cloud IoT platform provides updates to the computer devices and sensors (e.g., software, firmware, OS, or kernel updates), monitors the health of computer devices and sensors in real-time, and adapts the system's performance using specialized microservices. Moreover, a unique cloud environment and encryption codes are created for each computer device to support data privacy and security.

In some embodiments, a computer system receives at least one Wi-Fi probe request emitted by an electronic device. The Wi-Fi probe request includes multiple metadata fields. The computer system extracts data values present in a subset of the metadata fields. The subset of metadata fields is determined to be indicative of a type (e.g., make/model) of the electronic device based on previous training of a machine learning model. For example, the machine learning model is trained to identify other electronic devices based on wireless signals emitted by the other electronic devices. The computer system determines that at least one metadata field of the subset of metadata fields is empty. Responsive to determining that the metadata field is empty, the computer system inserts a particular value into the metadata field. The computer system generates a feature vector based on the data values present in the subset of metadata fields and the particular value. The feature vector is indicative of the type of the electronic device. The computer system determines, using the machine learning model, the type of the electronic device based on the feature vector. The computer system sends the type of the electronic device to a computer device.

In some embodiments, a computer system receives at least one Wi-Fi probe request emitted by an electronic device. The Wi-Fi probe request comprises multiple metadata fields. The electronic device has a make and/or model. The computer system extracts data values from a particular metadata field of the multiple metadata fields. The computer system determines, using the machine learning model, whether the data values are indicative of the make and/or model of the electronic device. The machine learning model is configured to determine types of electronic devices based on wireless signals emitted by the electronic devices.

Responsive to determining that the data values are indicative of the make and/or model, the computer system stores a reference to the particular metadata field and the make and/or model. The computer system generates a training set for the machine learning model based on data extracted from the particular metadata field of Wi-Fi probe requests emitted by the electronic devices.

In some embodiments, a computer system collects Wi-Fi probe requests emitted by electronic devices. The electronic devices have different makes and/or models, and the Wi-Fi probe requests include multiple metadata fields. Respective Wi-Fi probe requests are collected from each electronic device when each electronic device is placed in a Faraday bag or Faraday cage to prevent capture of other Wi-Fi probe requests emitted by each other electronic device. The computer system extracts data values from a subset of the multiple metadata fields. The subset of metadata fields is determined to be indicative of types of the electronic devices. The computer system combines the data values with information indicating the makes and/or models into a training set to train the machine learning model. The computer system stores the training set on a computer system to train the machine learning model to determine the makes and/or models based on wireless signals emitted by the electronic devices.

The benefits and advantages of the implementations described herein include real-time and more accurate insights into the types of electronic devices present at a location. Because mobile electronic devices are a strong indication of presence, the disclosed methods for detection and identification reduce unnecessary alerts and costly false-alarm dispatches. By adding known devices to their profiles, users obtain increased insight into when an electronic device enters their homes and whom it belongs to. In some examples, the disclosed systems reveal unknown or new devices that have not been previously connected to a certain network. Such device identification information can be revealed without the use of user input because the system disclosed herein may detect an unknown device by its broadcasted signals in proximity to a certain network. The disclosed systems also provide value outside of security threats, informing busy homeowners when teens arrive safe from school, if a nanny is late, or if other home awareness concerns arise. The disclosed apparatuses can be used as a standalone solution or as an addition to existing security systems to reduce false detections and enhance the context of alerts.

Moreover, operation of the disclosed apparatuses causes a reduction in greenhouse gas emissions compared to traditional methods for presence detection. Every year, approximately 40 billion tons of $CO^2$ are emitted around the world. Power consumption by digital technologies including home and business security systems accounts for approximately 4% of this figure. Further, conventional security systems can sometimes exacerbate the causes of climate change. For example, the average U.S. power plant expends approximately 600 grams of carbon dioxide for every kWh generated. The implementations disclosed herein for listening to passive Wi-Fi signals emitted by devices can mitigate climate change by reducing and/or preventing additional greenhouse gas emissions into the atmosphere. For example, the use of passive Wi-Fi signals reduces electrical power consumption and the amount of data transported and stored compared to traditional methods for presence detection that generate and store video data. In particular, by reducing unnecessary alerts and costly false-alarm dispatches, the disclosed systems provide increased efficiency compared to traditional methods.

Moreover, in the U.S., datacenters are responsible for approximately 2% of the country's electricity use, while globally they account for approximately 200 terawatt Hours (TWh). Transferring 1 GB of data can produce approximately 3 kg of $CO^2$. Each GB of data downloaded thus results in approximately 3 kg of $CO^2$ emissions or other greenhouse gas emissions. The storage of 100 GB of data in the cloud every year produces approximately 0.2 tons of $CO^2$ or other greenhouse gas emissions. Avoiding data-intensive video capture and storage using Wi-Fi signaling, cellular signaling, Bluetooth signaling, network discovery, and Wi-Fi fingerprinting instead reduces the amount of data transported and stored, and obviates the need for wasteful $CO^2$ emissions. Therefore, the disclosed implementations for translating raw data to insights at high levels of efficiency mitigates climate change and the effects of climate change by reducing the amount of data stored and downloaded in comparison to conventional technologies.

The description and associated drawings are illustrative examples and are not to be construed as limiting. This disclosure provides certain details for a thorough understanding and enabling description of these examples. One skilled in the relevant technology will understand, however, that the embodiments can be practiced without many of these details. Likewise, one skilled in the relevant technology will understand that the embodiments can include well-known structures or features that are not shown or described in detail, to avoid unnecessarily obscuring the descriptions of examples.

FIG. 1 is a block diagram that illustrates an example system 100 that can implement aspects of the present technology. The system 100 includes electronic devices 104, 108, 112, 116, 124, a user device 140, a computer device 120, a network 128, and a cloud server 132. Likewise, implementations of the example system 100 can include different and/or additional components or be connected in different ways. The system 100 is implemented using components of the example computer system 800 illustrated and described in more detail with reference to FIG. 8.

The system 100 provides a framework for detecting presence of electronic devices using passive Wi-Fi signals. The framework uses a trained machine learning model that learns relationships between real-time Wi-Fi probe request broadcast behavior and the types of electronic devices present. In some implementations, error metrics are defined to evaluate performance such as a confidence score, accuracy, and/or misclassification rate. The performance of the error metrics may be observed in unseen test datasets (e.g., the second Wi-Fi probe requests described in more detail below). In some examples, an acceptable range is defined for error metrics, e.g., 80-100% accuracy. For example, through testing, if the results of the test datasets return at least an 80% accurate identification of the device type, then that trained model may be used for future inferences. The disclosed methods for device identification have applications across different industry segments because they enable tracking the presence and movement of people in an area. System 100 can be used, for example, for public and private security systems in detecting unwanted presence, logistics, and monitoring of public transportation, and even for commercial venues to understand foot-traffic patterns. The methodology performed by system 100 is extensible to other wireless data transfer protocols, such as Bluetooth and cellular.

The system 100 can be used to perform a computer-implemented method for training a machine learning (ML) model, sometimes referred to as an artificial intelligence (AI) model. An example AI model 730 is illustrated and described in more detail with reference to FIG. 7. For example, computer device 120 collects multiple first Wi-Fi probe requests (training Wi-Fi probe requests) emitted by multiple first electronic devices (training electronic devices), for example, electronic devices 104, 108, 112, 116, 124). As shown by FIG. 1, electronic device 104 emits Wi-Fi probe request 136. The first electronic devices are used to engineer a feature set and train a machine learning model. Later, in operation, the trained machine learning model is used to detect presence of multiple second electronic devices (described below).

Computer device 120 can be a sensor device, a networking hardware device, a Wi-Fi access point, a smartphone, a laptop, a desktop, or a tablet. Computer device 120 may or may not be connected to a Wi-Fi network. Computer device 120 includes a Wi-Fi receiver (sometimes referred to as a Wi-Fi receiver circuit) that can receive passive Wi-Fi signals such as Wi-Fi probe requests sent from electronic devices located in proximity to the computer device 120 even when the electronic devices are not connected to a Wi-Fi network that the computer device 120 is connected to.

Electronic device 104 is a smartphone. Electronic device 108 is a wearable fitness device that is Wi-Fi capable. Electronic device 112 is a wearable device, such as a smartwatch, that is Wi-Fi capable. Electronic device 116 is an Internet of Things (IoT) device, such as a smart printer, that is Wi-Fi capable. With the proliferation of IoT devices, it becomes challenging to keep track of all connected devices and their activities. The disclosed methods monitor a wide range of wireless protocols and devices, providing insights into the presence and behavior of IoT devices.

Electronic device 124 is a smart device, such as a smart bulb, that is Wi-Fi capable. Electronic devices 104, 108, 112, 116, 120 can have different makes and/or models. User device 140 is a smartphone, tablet, laptop, or desktop capable of communicating with the computer device 120 and/or the cloud server 132. The computer device 120 is connected to the cloud server 132 via network 128, which can be a Wi-Fi network, the Internet, or a cellular network. The network 128 can be implemented using example network 814 illustrated and described in more detail with reference to FIG. 8.

In some implementations, the first Wi-Fi probe requests are collected by receiving respective Wi-Fi probe requests (e.g., Wi-Fi probe request 136) from each of the first electronic devices (e.g., electronic device 104) when each other of the first electronic devices (e.g., electronic device 108) is placed in a Faraday bag or cage to prevent capture of Wi-Fi probe requests emitted by each of the first electronic devices. The respective Wi-Fi probe requests are superimposed into the first Wi-Fi probe requests to simulate presence of the first electronic devices. In some example aspects, the first probe request may be used in a training dataset, and the second probe request may be received as a real-world signal that is subsequently analyzed and scored using at least one ML model that is trained on the training dataset. Further, the second probe request may be captured and used in an implementation dataset. Both the training dataset(s) and implementation dataset(s) may be used to continue to train the ML model(s) described herein that enable the system to accurately identify the types of electronic devices in an area.

The first Wi-Fi probe requests may indicate Media Access Control (MAC) addresses of the first electronic devices, manufacturers of the first electronic devices, and/or connection capabilities of the first electronic devices. The disclosed systems focus on a methodology for identifying devices based on certain metadata fields that may be received from passive Wi-Fi signals, specifically Wi-Fi probe requests. A probe request contains certain metadata fields, such as the device's MAC address (a unique identifier), the device manufacturer, and the devices' connection capabilities (e.g., data rates supported and protocol specific information), among other metadata fields. By passively listening to the broadcasted probe requests, system 100 intercepts, analyzes these signals, and can predict the identity of the device (e.g., the device's type, manufacturer, model number, etc.), even though the device may not be directly connected to the local Wi-Fi network. Further, based on the populated metadata fields the system receives, the system may use at least one underlying trained ML model to predictively fill in other metadata fields that may be received as unpopulated (or blank).

Given a snapshot of recent probe request activity, information about the unique quantities of different probe request metadata fields are extracted. In some implementations, a trained Gradient-Boosting Decision Tree (GBDT) machine learning model is used. The extracted features from the metadata fields are fed into this model and may represent information related to the identity of the device(s). In some example aspects, the metadata fields (e.g., connection type, data transfer rate, WiFi connection strength, etc.) may be passed to the GBDT model, and the GBDT model may use these metadata fields to create features that are then reincorporated into the model (i.e., to make the model more accurate).

Multiple features are generated (sometimes referred to as feature extraction) from the first Wi-Fi probe requests. For example, the multiple features are extracted for generating a training set for a machine learning model. By analyzing RF data and employing advanced machine learning algorithms, the disclosed methods provide valuable data-driven insights. This data is used to enhance both security and the user experience. Feature engineering (or feature extraction or feature discovery) is the process of extracting features (characteristics, properties, or attributes) from raw data (e.g., Wi-Fi probe requests). Features and feature vectors are described in more detail with reference to FIG. 7. The feature generation can be performed on the computer device 120. Information describing the first Wi-Fi probe requests can be sent from the computer device 120 to the cloud server 132 after the computer device 120 collects the first Wi-Fi probe requests, such that the feature generation is performed on the cloud server 132. The first Wi-Fi probe requests include multiple metadata fields. For example, data values extracted from the metadata fields may indicate radio frequencies and/or data rates supported by the first electronic devices. Such data values can be used as features or portions of a feature vector.

In some implementations, the features indicate a unique data value present in one of the metadata fields during at least one of the timeframes. In some implementations, the features generated indicate data values of multiple metadata fields in at least one of the multiple Wi-Fi probe requests associated with a particular frequency channel. Using the data values in a Wi-Fi probe request associated with a particular frequency channel to train the machine learning model reduces the misclassification error/rate of the machine learning model. In some implementations, the features indicate a mode (most common value) of data values present in one of the metadata fields. The mode may be compared against a confidence threshold to determine whether the misclassification error/rate is low enough for use in the model. Certain confidence intervals may require that an output is 95% accurate in order for the dataset to be incorporated into the model.

The features generated may identify the type of electronic device emitting the Wi-Fi probe request. The system 100 determines the identity (type, manufacturer, model number, etc.) of at least one electronic device in proximity to the computer device 120. For example, computer device 120 is in a home or business. For example, computer device 120 may be a router or modem. Computer device 120 may receive a Wi-Fi probe request from at least one electronic device, such as device 140 (a smartphone). The Wi-Fi probe request from device 140 may include metadata that computer device 120 reads and extracts. The metadata that is transmitted via the Wi-Fi probe request may indicate the type of electronic device that is initiating the probe request based on a trained machine learning model that has analyzed other electronic devices' metadata associated with certain electronic device types. Based on the analyzed metadata from the electronic device (such as smartphone device 140), the computer device 120 that is running the trained machine learning model may identify that device 140 is indeed a smartphone. The machine learning model may also conclude that the smartphone is made by a certain manufacturer and is a certain model. In some implementations, the Wi-Fi probe request may include metadata fields that are blank. The machine learning model may suggest data to populate the blank metadata fields based on the other metadata that was transmitted along with the Wi-Fi probe request. A feature vector based on the data values present in the multiple metadata fields may be generated, wherein the feature vector is indicative of the type of electronic device that is transmitting the Wi-Fi probe request.

A training set generated from the features is stored on a computer system (e.g., cloud server 132) to train a machine learning model to determine a type (i.e., identity) of multiple second electronic devices (similar to the first electronic devices) based on a feature vector extracted from multiple second Wi-Fi probe requests emitted by the second electronic devices. Storing the training set on the computer system can cause a reduction in greenhouse gas emissions compared to traditional home security methods that store training video images captured by cameras in proximity to the first electronic devices. For example, avoiding data-intensive video capture and storage using the Wi-Fi signaling methods disclosed herein reduces the amount of data transported and stored, and reduces $CO^2$ emissions caused by datacenters.

The expected types of first electronic devices present can impact the prediction value of each of the input features at different moments in time. Through training, the ML model learns and analyzes patterns, picks up on the relationships between the features and the number of first electronic devices, and can more accurately predict the types of second electronic devices in functional operation based on future observed values of the features. Once system 100 is deployed with the trained model in place, the model can usually identify the types of electronic device transmitting Wi-Fi probe requests based on new probe request snapshots and the extracted feature values.

The machine learning model is trained using the generated features with information indicating the makes and/or models of the first electronic devices. In some examples, the features are combined with information indicating the makes and/or models of the first electronic devices into a training set to train the machine learning model. The information indicating the makes and/or models can be used as a training and/or validation training set or as expected results for the machine learning model. In some examples, the training set may be used to fit a model, and the validation set may be a hold-out set that is independent of the training set. The validation set may be used to verify and/or validate the model. A third set, a test set, may be used to combat model overfit, in some circumstances. AI and ML training methods are described in more detail with reference to FIG. 7.

The machine learning model is trained to determine presence of and types of electronic devices in proximity to a computer device (e.g., computer device 120) based on a feature vector extracted from the second Wi-Fi probe requests received from the electronic devices. Example AI and ML operation using a trained model is illustrated and described in more detail with reference to FIG. 7. In some implementations, the machine learning model is trained using the training set to detect a difference between two of the second electronic devices having a same make and/or model (e.g., whether a certain smartphone model has 64 GB or 256 GB storage).

While the first electronic devices are used to train the ML model, the trained ML model is used to later detect presence of and identify the types of the second electronic devices. The second Wi-Fi probe requests are received via a Wi-Fi receiver communicably coupled to a computer system (e.g., computer device 120 or the cloud server 132). Thus, identifying the type(s) of the second electronic devices can be performed on computer device 120 or the cloud server 132. The trained machine learning model is stored on the computer system (e.g., computer device 120 or the cloud server 132) to determine the presence and types of the second electronic devices in proximity to the Wi-Fi receiver.

In some implementations, the machine learning model is a gradient-boosting decision tree. A gradient-boosting decision tree can be used for solving prediction problems in both classification and regression domains. The gradient-boosting decision tree approach improves the learning process by simplifying the objective and reducing the number of iterations to get to a sufficiently optimal solution.

Figure 2:
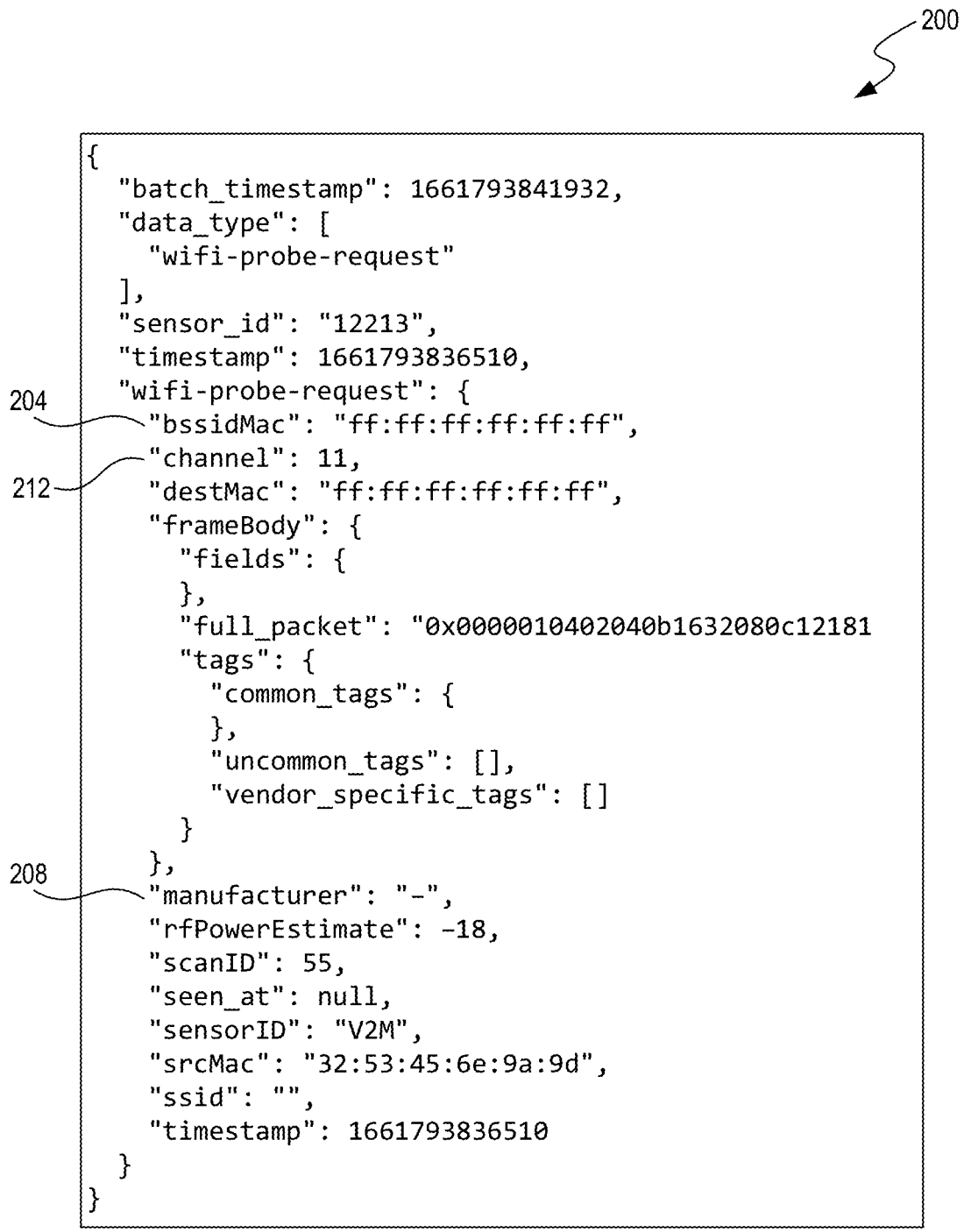
FIG. 2 is a drawing that illustrates at least one example Wi-Fi probe request emitted by at least one electronic device.

FIG. 2 is a drawing that illustrates an example Wi-Fi probe request emitted by an electronic device. The scalable and repeatable process performed by system 100 (illustrated and described in more detail with reference to FIG. 1) is used to run experiments and collect high quality training sets describing how different devices communicate using different RF protocols. By making use of Faraday cages (tools used to block ambient RF signals), emitted RF data from a single electronic device is captured, including passive Wi-Fi signals (Wi-Fi probe requests). After repeating the Wi-Fi probe request capture process across different makes and/or models of electronic devices, a high quality training set is generated that can be used as the basis for training the ML model.

Specifically in FIG. 2, MAC address 204 ("bssidMac") may indicate the address of an access point or wireless router that is used to connect to Wi-Fi. The channel 212 is the channel that the Wi-Fi probe request was received on. Within the Wi-Fi probe request, the manufacturer metadata label 208 may be blank. However, based on the other metadata fields included in the Wi-Fi probe request (such as data throughput rates, storage constraints, and supported Wi-Fi connection types), the trained machine learning model may be able to determine the manufacturer of the electronic device requesting the Wi-Fi probe request. If the computer device (e.g., device 120) can determine the manufacturer of the device transmitting the Wi-Fi probe request above a certain confidence threshold, then the manufacturer metadata field may be populated by the computer device 120 based on the results of the trained machine learning model.

Figure 3:
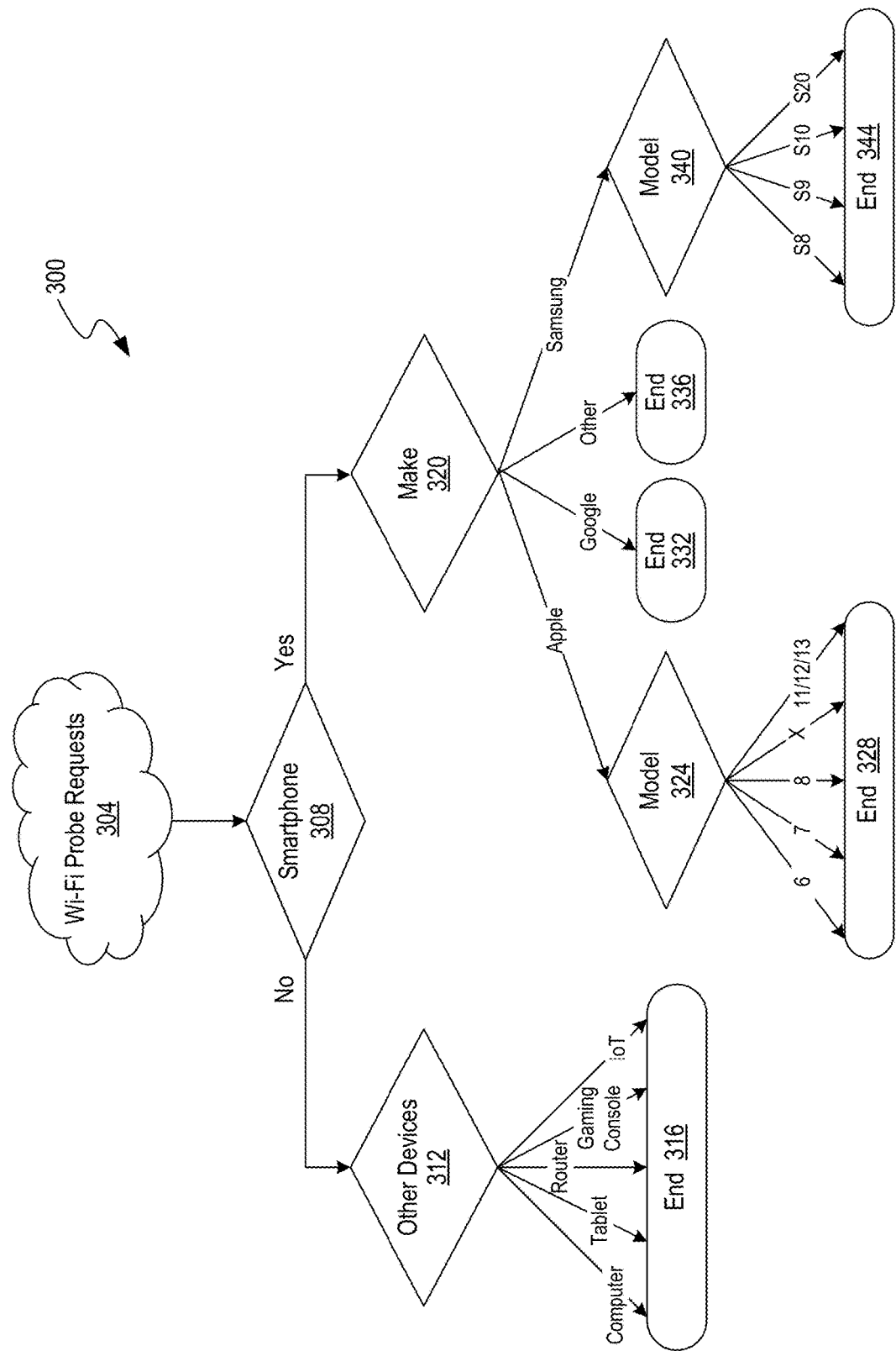
FIG. 3 is a flow diagram that illustrates an example process for detecting a type of an electronic device.

FIG. 3 is an example flow chart that a trained machine learning model may implement to determine the type of an electronic device that is transmitting a Wi-Fi probe request. For example, Wi-Fi probe requests 304 may be received at a computer device (like computer device 120 from FIG. 1). The Wi-Fi probe request may be analyzed by at least one trained machine learning model stored on the computer device 120. The machine learning model may first determine if the Wi-Fi probe request is originating from a smartphone or not at decision block 308. If the machine learning model determines that the probe request is originating from a smartphone, then it will branch to the right via the YES path. If "YES," then the machine learning model will next attempt to determine the Make of the smartphone at decision block 320. Using the metadata fields that are populated and historical data, the machine learning model may determine that the smartphone Make is one of Apple, Google, Samsung, or Other. If Google, then the analysis may end at 332 without attempting to determine a model of that Google smartphone. If Other, the analysis may end at 336 if a model cannot be derived from the metadata. If Apple or Samsung are identified as the manufacturer of the smartphone, then the machine learning model may reach decision blocks 324 or 340 to determine the model of the Apple or Samsung smartphone. After identifying the model of the smartphone, the analysis may conclude at 328 or 344, and the make and model results may be returned at the computer device 120. The results may then be used by the system to populate certain blank metadata fields in the Wi-Fi probe request, such as manufacturer and model number.

Figure 4:
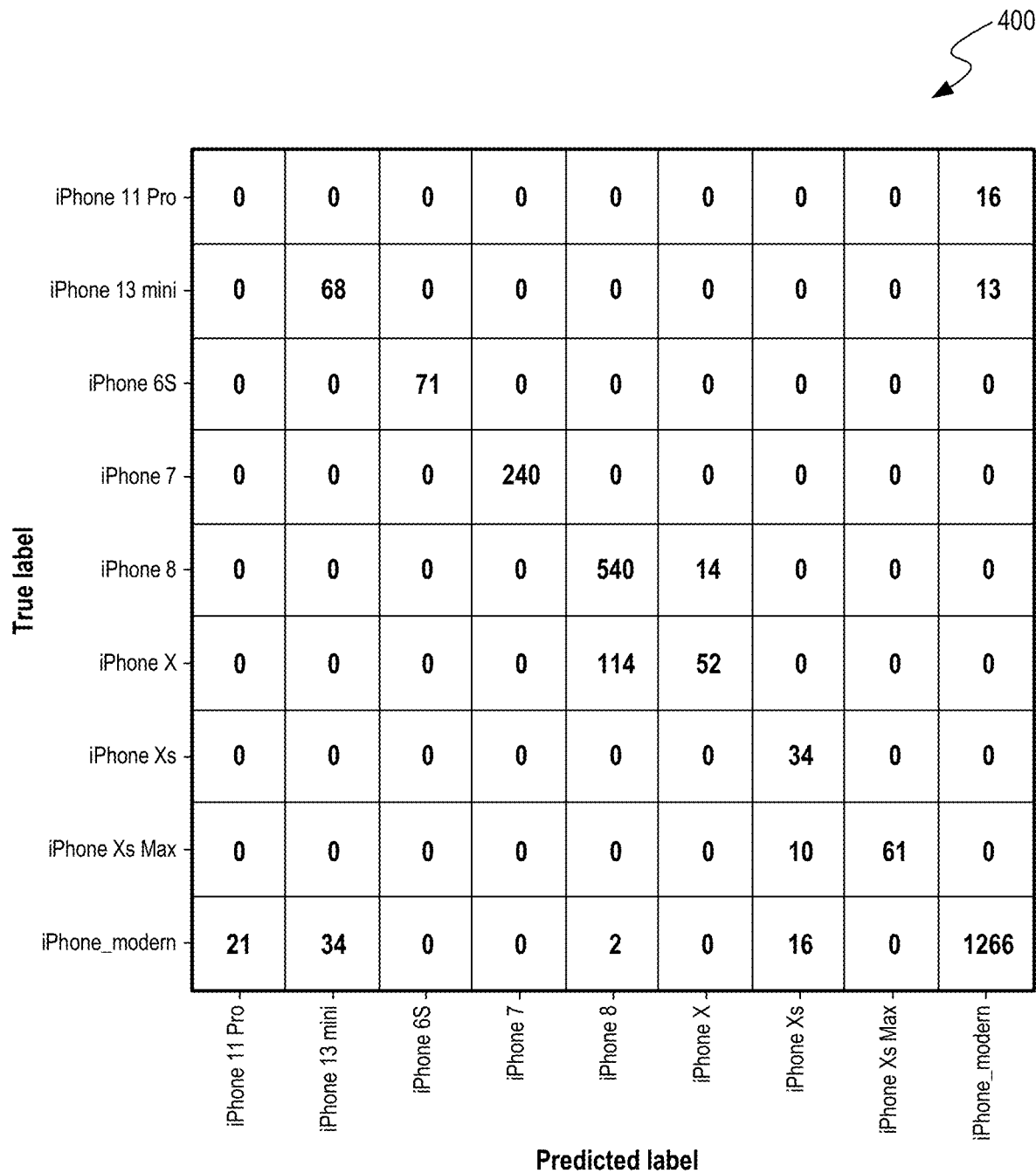
FIG. 4 is a drawing that illustrates a confusion matrix generated by performing a process for detecting types of electronic devices.

FIG. 4 is an example confusion matrix with the "predicted label" on the x-axis and the "true label" on the y-axis. The confusion matrix 400 illustrates an example of the quality of a trained machine learning model for accurately identifying an electronic device type via a Wi-Fi probe request. As illustrated, matrix 400 shows the number of predicted and true labels assigned to the types of the electronic devices, meaning that, e.g., the machine learning model predicted that the type of electronic device was an iPhone 8 656 times, but only 540 of those predictions were correct, since the true label of iPhone 8 was 540 times. 114 predictions of an iPhone 8 device turned out to be an iphone X device, and 2 of the predictions turned out to be an iPhone modem. As evidenced by the confusion matrix 400, the machine learning model is highly accurate with an accuracy of over 80% for most device types.

Figure 5:
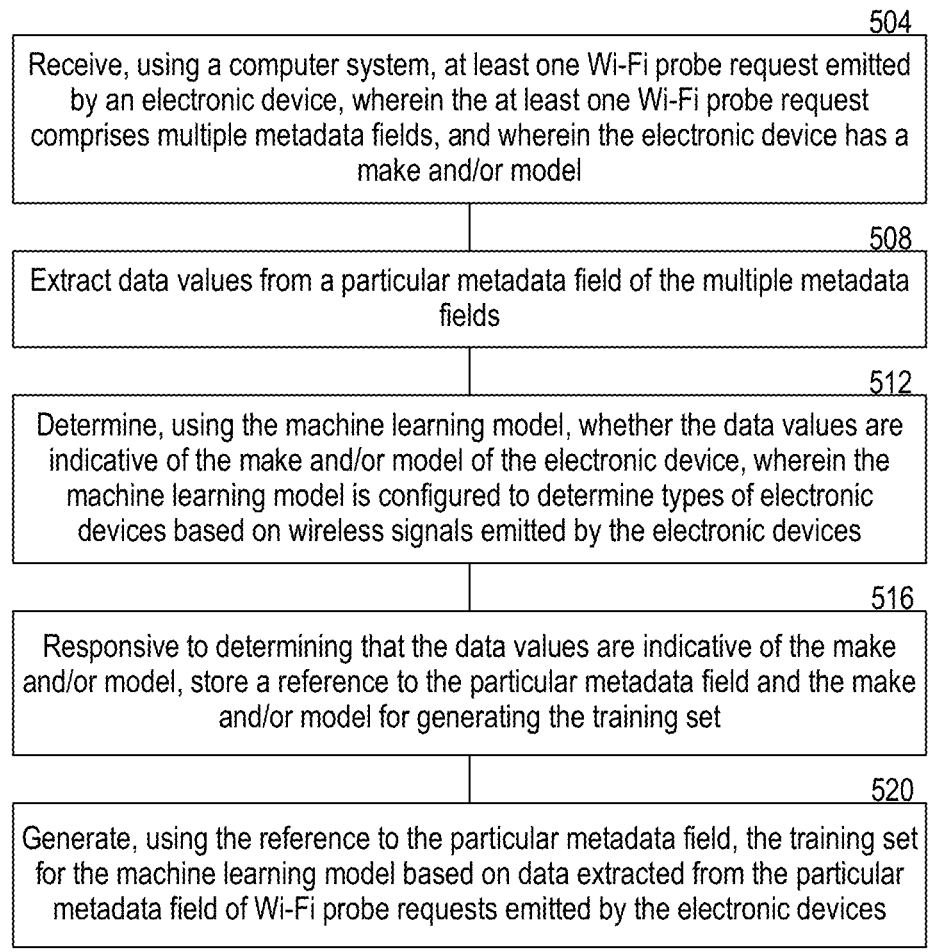
FIG. 5 is a flow diagram that illustrates an example process for detecting a type of an electronic device.

FIG. 5 is a flow diagram of an example process for identifying a device type from a Wi-Fi probe request. In step 504, a system (such as the one running on computer device 120) may receive at least one Wi-Fi probe request emitted by an electronic device (such as device 140, a smartphone). The Wi-Fi probe request may comprise multiple metadata fields, including but not limited to a MAC address, data throughput constraints, storage constraints, and other identifying information. The electronic device transmitting the Wi-Fi probe request may have a make and model.

In step 508, the system may extract the data values from particular metadata fields that contain values. These values may be received by a machine learning model that is running on the computer system. In step 512, the machine learning model may determine whether the data values from the metadata fields are indicative of a certain make or model of the electronic device. The machine learning model may rely on previously trained data and historical datasets with metadata fields to make a determination of the electronic device type.

In step 516, responsive to determining that the metadata values are indicative of a make and/or model of the electronic device transmitting the Wi-Fi probe request, the system may store a reference to certain metadata fields that indicate with high confidence a certain make or model of the electronic device. For example, a certain weight indicative of a confidence score may be assigned to each metadata field when determining the make or model of an electronic device. Some metadata fields may have higher weights than others when determining the make or model of an electronic device. The weights may be assigned by the machine learning model based on the machine learning model's historical datasets and analyses. In some examples, metadata fields such as connection type, data transfer rate, and WiFi connection strength may be assigned higher weights than other metadata fields. In other examples, these metadata fields may be assigned lower weights, based on the current WiFi protocols of the time.

In step 520, the system may generate a new training set for the machine learning model based on the data extracted from a particular metadata field of Wi-Fi probe requests emitted by at least one electronic device. In some examples, the resultant data from the machine learning model may not only indicate with a certain confidence score that an electronic device is associated with a certain make and/or model, but also serve the dual-purpose of being additional training data for the machine learning model. In some instances, the predictive results may be checked against actual results (via a confusion matrix like in FIG. 4). The results of the comparison with the matrix may also be sent back to the machine learning model as new training data to improve the model's accuracy.

Figure 6:
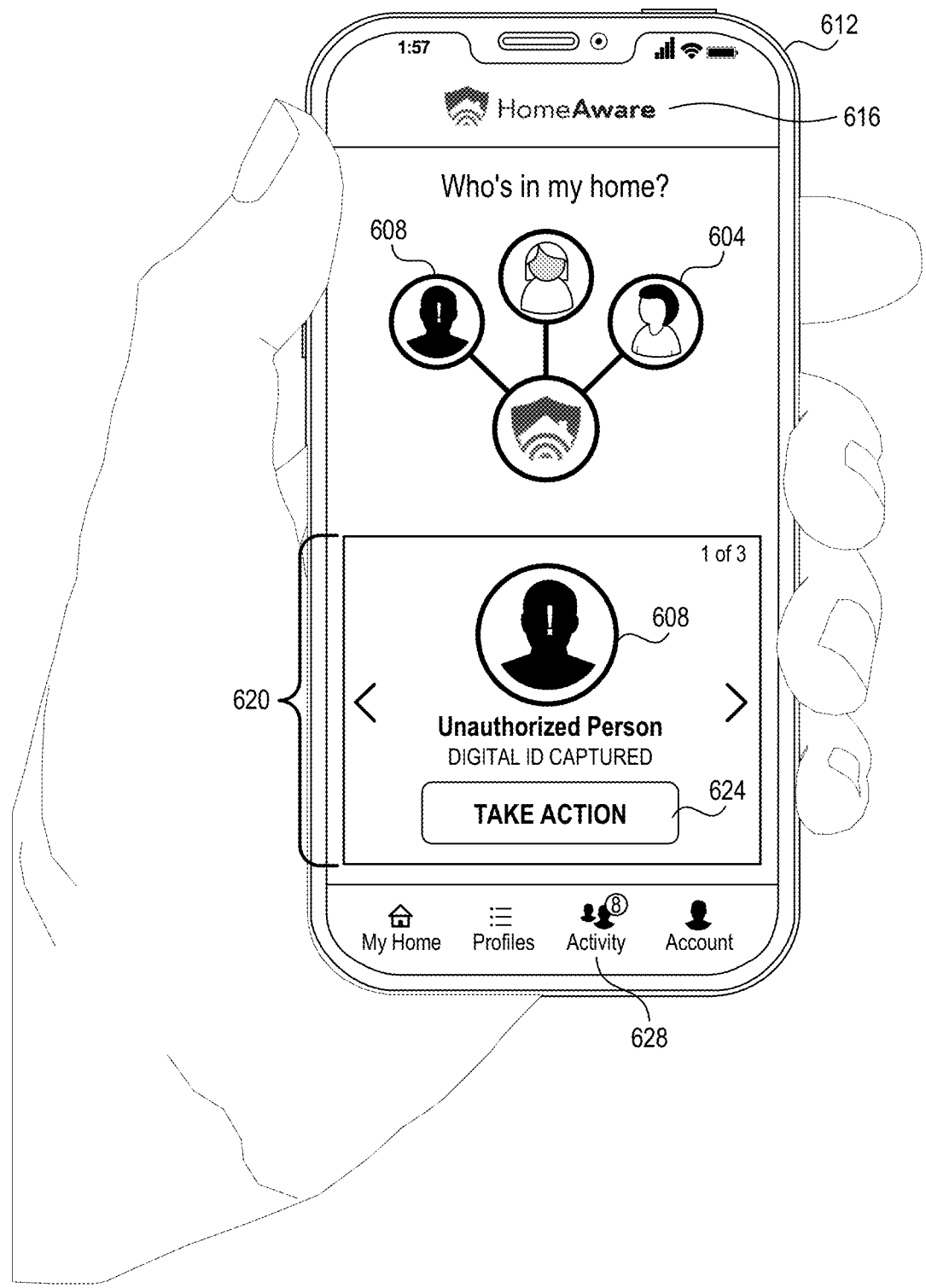
FIG. 6 is a drawing that illustrates a software application operating on a user device.

FIG. 6 is an example smartphone with home security application HomeAware® running. Smartphone 612 shows the home security application 616 on the "Activity" tab 628 with a user interface describing the individuals inside the user's home. Person 604 is an identified person that the home security application 616 recognizes; however, person 608 is an unidentified person. The user interface identifies person 608 as an unauthorized person and provides the user a modal 620 with a call-to-action button 624 "Take Action." The system may have been able to detect this unauthorized person 608 due to the person's 608 electronic device that was transmitting Wi-Fi probe requests to a computer device inside the user's home (such as an Internet router or modem). Although unauthorized person 608 may not have connected to the Wi-Fi network directly, the system still detected this unauthorized person due to the metadata that was transmitted via the Wi-Fi probe requests. The metadata was received by the system and analyzed by the machine learning model. Based on the results of the analysis, the system determined that the electronic device transmitting the Wi-Fi probe request is an unrecognized and unauthorized person. Once the system recognized the person was an unauthorized individual, the system transmitted an alert to the home security HomeAware® application and alerted the user inside the Activity 628 tab.

Figure 7:
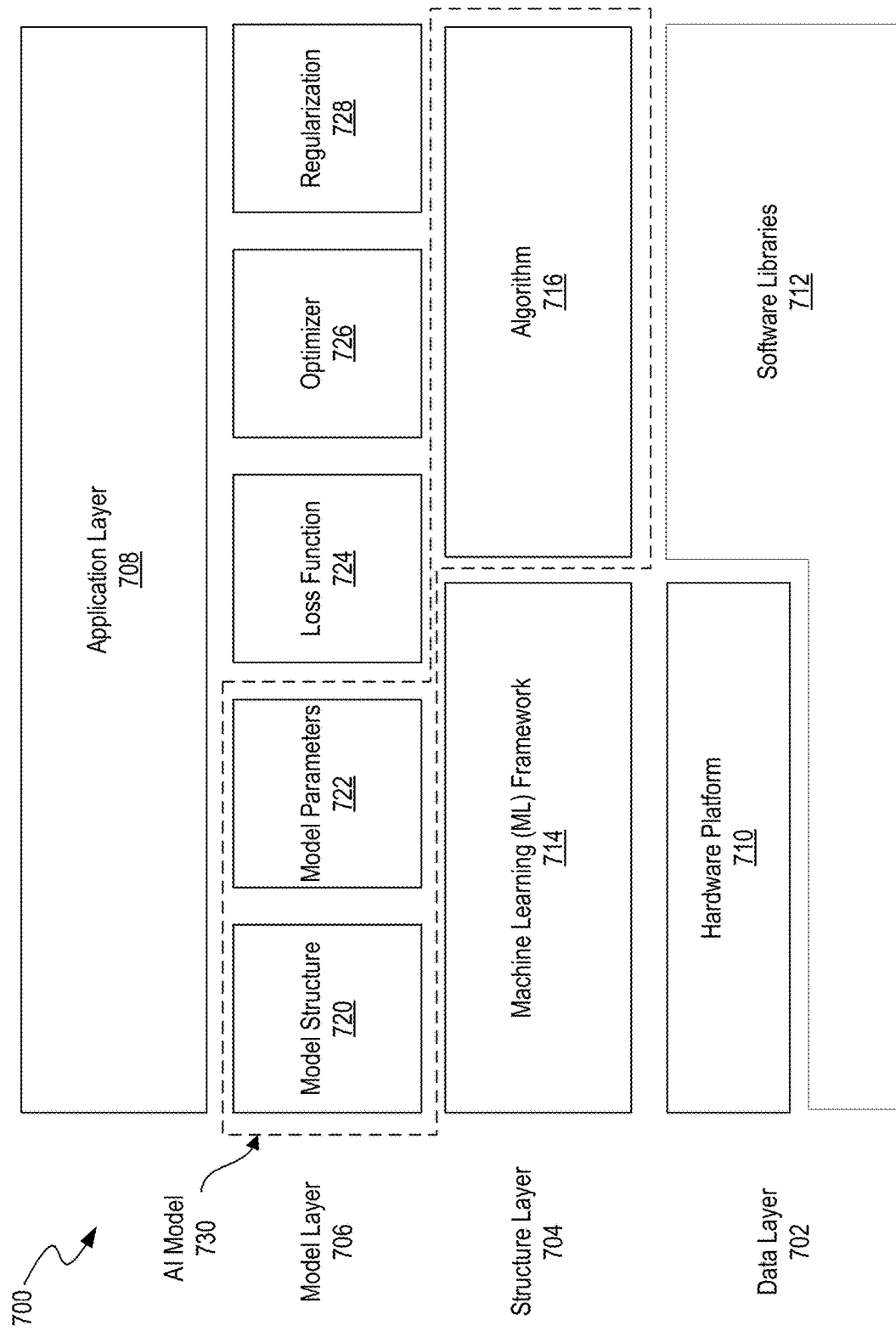
FIG. 7 is a block diagram that illustrates an example artificial intelligence (AI) system that can implement aspects of the present technology.

FIG. 7 is a block diagram that illustrates an example artificial intelligence (AI) system 700 that can implement aspects of the present technology. The AI system 700 is implemented using components of the example computer system 800 illustrated and described in more detail with reference to FIG. 8. For example, the AI system 700 can be implemented using the processor 802 and instructions 808 programmed in the memory 806 illustrated and described in more detail with reference to FIG. 8. Likewise, implementations of the AI system 700 can include different and/or additional components or be connected in different ways.

As shown, the AI system 700 can include a set of layers, which conceptually organize elements within an example network topology for the AI system's architecture to implement a particular AI model 730. Generally, an AI model 730 is a computer-executable program implemented by the AI system 700 that analyzes data to make predictions. Information can pass through each layer of the AI system 700 to generate outputs for the AI model 730. The layers can include a data layer 702, a structure layer 704, a model layer 706, and an application layer 708. The algorithm 716 of the structure layer 704 and the model structure 720 and model parameters 722 of the model layer 706 together form the example AI model 730. The optimizer 726, loss function engine 724, and regularization engine 728 work to refine and optimize the AI model 730, and the data layer 702 provides resources and support for application of the AI model 730 by the application layer 708.

The data layer 702 acts as the foundation of the AI system 700 by preparing data for the AI model 730. As shown, the data layer 702 can include two sub-layers: a hardware platform 710 and one or more software libraries 712. The hardware platform 710 can be designed to perform operations for the AI model 730 and include computing resources for storage, memory, logic and networking, such as the resources described in relation to FIG. 8. The hardware platform 710 can process amounts of data using one or more servers. The servers can perform backend operations such as matrix calculations, parallel calculations, machine learning (ML) training, and the like. Examples of servers used by the hardware platform 710 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 710 can include Infrastructure as a Service (IaaS) resources, which are computing resources, (e.g., servers, memory, etc.) offered by a cloud services provider. The hardware platform 710 can also include computer memory for storing data about the AI model 730, application of the AI model 730, and training data for the AI model 730. The computer memory can be a form of random-access memory (RAM), such as dynamic RAM, static RAM, and non-volatile RAM.

The software libraries 712 are suites of data and programming code, including executables, used to control the computing resources of the hardware platform 710. The programming code can include low-level primitives (e.g., fundamental language elements) that form the foundation of one or more low-level programming languages, such that servers of the hardware platform 710 can use the low-level primitives to carry out specific operations. The low-level programming languages do not require much, if any, abstraction from a computing resource's instruction set architecture, allowing them to run quickly with a small memory footprint. Examples of software libraries 712 that can be included in the AI system 700 include Intel Math Kernel Library, Nvidia cuDNN, Eigen, and Open BLAS.

The structure layer 704 can include a machine learning (ML) framework 714 and an algorithm 716. The ML framework 714 can be thought of as an interface, library, or tool that allows users to build and deploy the AI model 730. The ML framework 714 can include an open-source library, an application programming interface (API), a gradient-boosting library, an ensemble method, and/or a deep learning toolkit that work with the layers of the AI system facilitate development of the AI model 730. For example, the ML framework 714 can distribute processes for application or training of the AI model 730 across multiple resources in the hardware platform 710. The ML framework 714 can also include a set of pre-built components that have the functionality to implement and train the AI model 730 and allow users to use pre-built functions and classes to construct and train the AI model 730. Thus, the ML framework 714 can be used to facilitate data engineering, development, hyperparameter tuning, testing, and training for the AI model 730.

Examples of ML frameworks 714 or libraries that can be used in the AI system 700 include TensorFlow, PyTorch, Scikit-Learn, Keras, and Caffe. Random Forest is a machine learning algorithm that can be used within the ML frameworks 714. LightGBM is a gradient boosting framework/algorithm (an ML technique) that can be used. Other techniques/algorithms that can be used are XGBoost, CatBoost, etc. Amazon Web Services™ is a cloud service provider that offers various machine learning services and tools (e.g., Sage Maker) that can be used for platform building, training, and deploying ML models. In other examples, the machine learning model(s) disclosed herein may rely on a variety of classification algorithms, such as regression based (e.g., logistic regression), tree based (e.g., decision tree, random forest classifiers, gradient boosted decision trees, etc.), clustering techniques (e.g., kNN, K-means, etc.), and/or neural network architectures (MLP, CNN, etc.). In other examples, the machine learning model(s) may rely on a combination of one or more of the aforementioned classification algorithms.

The algorithm 716 can be an organized set of computer-executable operations used to generate output data from a set of input data and can be described using pseudocode. The algorithm 716 can include complex code that allows the computing resources to learn from new input data and create new/modified outputs based on what was learned. In some implementations, the algorithm 716 can build the AI model 730 through being trained while running computing resources of the hardware platform 710. This training allows the algorithm 716 to make predictions or decisions without being explicitly programmed to do so. Once trained, the algorithm 716 can run at the computing resources as part of the AI model 730 to make predictions or decisions, improve computing resource performance, or perform tasks. The algorithm 716 can be trained using supervised learning, unsupervised learning, semi-supervised learning, and/or reinforcement learning.

Using supervised learning, the algorithm 716 can be trained to learn patterns (e.g., map input data to output data) based on labeled training data. The training data may be labeled by an external user or operator. For instance, a user may collect a set of training data, such as by capturing data from sensors, images from a camera, outputs from a model, and the like. In an example implementation, training data can include Wi-Fi probe requests or formatted features generated from Wi-Fi probe requests. The user may label the training data based on one or more classes and trains the AI model 730 by inputting the training data to the algorithm

716. The algorithm determines how to label the new data based on the labeled training data. The user can facilitate collection, labeling, and/or input via the ML framework 714. In some instances, the user may convert the training data to a set of feature vectors for input to the algorithm 716. Once trained, the user can test the algorithm 716 on new data to determine if the algorithm 716 is predicting accurate labels for the new data. For example, the user can use cross-validation methods to test the accuracy of the algorithm 716 and retrain the algorithm 716 on new training data if the results of the cross-validation are below an accuracy threshold.

Supervised learning can involve classification and/or regression. Classification techniques involve teaching the algorithm 716 to identify a category of new observations based on training data and are used when input data for the algorithm 716 is discrete. Said differently, when learning through classification techniques, the algorithm 716 receives training data labeled with categories (e.g., classes) and determines how features observed in the training data (e.g., a unique combination of the data values present in at least two of the metadata fields) relate to the categories (e.g., different makes and/or models). Once trained, the algorithm 716 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques involve estimating relationships between independent and dependent variables and are used when input data to the algorithm 716 is continuous. Regression techniques can be used to train the algorithm 716 to predict or forecast relationships between variables. A logistic regression is a type of classification algorithm. To train the algorithm 716 using regression techniques, a user can select a regression method for estimating the parameters of the model. The user collects and labels training data that is input to the algorithm 716 such that the algorithm 716 is trained to understand the relationship between data features and the dependent variable(s). Once trained, the algorithm 716 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine-learning based pre-processing operations.

Under unsupervised learning, the algorithm 716 learns patterns from unlabeled training data. In particular, the algorithm 716 is trained to learn hidden patterns and insights of input data, which can be used for data exploration or for generating new data. Here, the algorithm 716 does not have a predefined output, unlike the labels output when the algorithm 716 is trained using supervised learning. Said another way, unsupervised learning is used to train the algorithm 716 to find an underlying structure of a set of data, group the data according to similarities, and represent that set of data in a compressed format. The systems disclosed herein can use unsupervised learning to identify patterns in data received from the network (e.g., to identify particular makes and/or models of electronic devices) and so forth. In some implementations, performance of an ML model that can use unsupervised learning is improved because the ML model learns relationships between real-time Wi-Fi probe request broadcast behavior and a number of electronic devices present, as described herein.

A few techniques can be used in unsupervised learning: clustering, anomaly detection, and techniques for learning latent variable models. Clustering techniques involve grouping data into different clusters that include similar data, such that other clusters contain dissimilar data. For example, during clustering, data with possible similarities remain in a group that has less or no similarities to another group. Examples of clustering techniques density-based methods, hierarchical based methods, partitioning methods, and grid-based methods. In one example, the algorithm 716 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 716 may be trained to be an Isolation Forest, local outlier factor (LOF) algorithm, or K-nearest neighbor (k-NN) algorithm. Latent variable techniques involve relating observable variables to a set of latent variables. These techniques assume that the observable variables are the result of an individual's position on the latent variables and that the observable variables have nothing in common after controlling for the latent variables. Examples of latent variable techniques that may be used by the algorithm 716 include factor analysis, item response theory, latent profile analysis, and latent class analysis.

The model layer 706 implements the AI model 730 using data from the data layer and the algorithm 716 and ML framework 714 from the structure layer 704, thus enabling decision-making capabilities of the AI system 700. The model layer 706 includes a model structure 720, model parameters 722, a loss function engine 724, an optimizer 726, and a regularization engine 728.

The model structure 720 describes the architecture of the AI model 730 of the AI system 700. The model structure 720 defines the complexity of the pattern/relationship that the AI model 730 expresses. Examples of structures that can be used as the model structure 720 include decision trees, support vector machines, regression analyses, Bayesian networks, Gaussian processes, genetic algorithms, and artificial neural networks (or, simply, neural networks). The model structure 720 can include a number of structure layers, a number of nodes (or neurons) at each structure layer, and activation functions of each node. Each node's activation function defines how to node converts data received to data output. The structure layers may include an input layer of nodes that receive input data, an output layer of nodes that produce output data. The model structure 720 may include one or more hidden layers of nodes between the input and output layers. The model structure 720 can be an Artificial Neural Network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, and Generative Adversarial Networks (GANs).

The model parameters 722 represent the relationships learned during training and can be used to make predictions and decisions based on input data. The model parameters 722 can weight and bias the nodes and connections of the model structure 720. For instance, when the model structure 720 is a neural network, the model parameters 722 can weight and bias the nodes in each layer of the neural networks, such that the weights determine the strength of the nodes and the biases determine the thresholds for the activation functions of each node. The model parameters 722, in conjunction with the activation functions of the nodes, determine how input data is transformed into desired outputs. The model parameters 722 can be determined and/or altered during training of the algorithm 716.

The loss function engine 724 can determine a loss function, which is a metric used to evaluate the AI model's 730 performance during training. For instance, the loss function engine 724 can measure the difference between a predicted output of the AI model 730 and the actual output of the AI model 730 and is used to guide optimization of the AI model 730 during training to minimize the loss function. The loss function may be presented via the ML framework 714, such that a user can determine whether to retrain or otherwise alter the algorithm 716 if the loss function is over a threshold. In some instances, the algorithm 716 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 726 adjusts the model parameters 722 to minimize the loss function during training of the algorithm 716. In other words, the optimizer 726 uses the loss function generated by the loss function engine 724 as a guide to determine what model parameters lead to the most accurate AI model 730. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 726 used may be determined based on the type of model structure 720 and the size of data and the computing resources available in the data layer 602.

The regularization engine 728 executes regularization operations. Regularization is a technique that prevents over—and under-fitting of the AI model 730. Overfitting occurs when the algorithm 716 is overly complex and too adapted to the training data, which can result in poor performance of the AI model 730. Underfitting occurs when the algorithm 716 is unable to recognize even basic patterns from the training data such that it cannot perform well on training data or on validation data. The regularization engine 728 can apply one or more regularization techniques to fit the algorithm 716 to the training data properly, which helps constraint the resulting AI model 730 and improves its ability for generalized application. Examples of regularization techniques include lasso (L1) regularization, ridge (L2) regularization, and elastic (L1 and L2 regularization).

The application layer 708 describes how the AI system 700 is used to solve problem or perform tasks. In an example implementation, the application layer 708 can include instructions for the process of FIG. 6.

Figure 8:
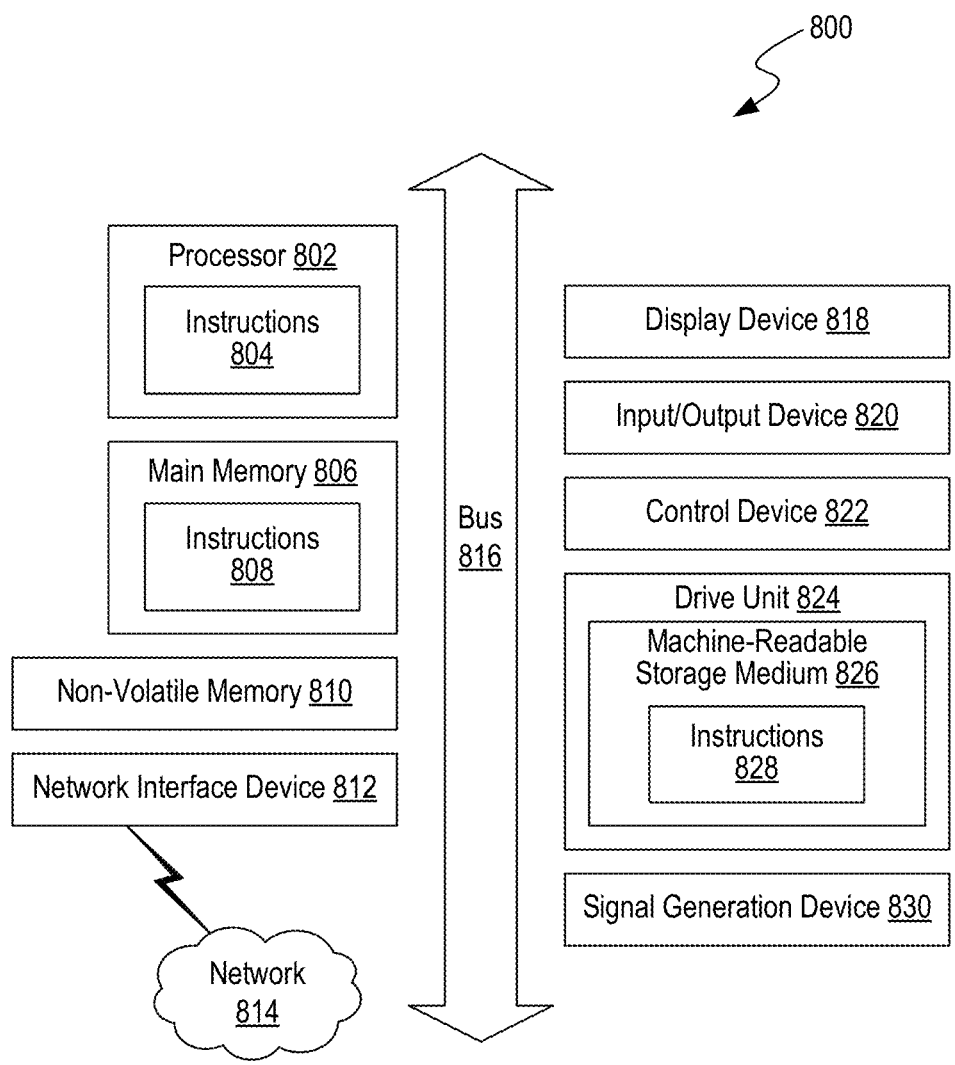
FIG. 8 is a block diagram that illustrates an example computer system in which at least some operations described herein can be implemented.

FIG. 8 is a block diagram that illustrates an example of a computer system 800 in which at least some operations described herein can be implemented. As shown, the computer system 800 can include: one or more processors 802, main memory 806, non-volatile memory 810, a network interface device 812, video display device 818, an input/output device 820, a control device 822 (e.g., keyboard and pointing device), a drive unit 824 that includes a storage medium 826, and a signal generation device 830 that are communicatively connected to a bus 816. The bus 816 represents one or more physical buses and/or point-to-point connections that are connected by appropriate bridges, adapters, or controllers. Various common components (e.g., cache memory) are omitted from FIG. 8 for brevity. Instead, the computer system 800 is intended to illustrate a hardware device on which components illustrated or described relative to the examples of the figures and any other components described in this specification can be implemented.

The computer system 800 can take any suitable physical form. For example, the computer system 800 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 800. In some implementations, the computer system 800 can be an embedded computer system, a system-on-chip (SOC), a single-board computer system (SBC) or a distributed system such as a mesh of computer systems or include one or more cloud components in one or more networks. Where appropriate, one or more computer systems 800 can perform operations in real-time, near real-time, or in batch mode.

The network interface device 812 enables the computer system 800 to mediate data in a network 814 with an entity that is external to the computer system 800 through any communication protocol supported by the computer system 800 and the external entity. Examples of the network interface device 812 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 806, non-volatile memory 810, machine-readable medium 826) can be local, remote, or distributed. Although shown as a single medium, the machine-readable medium 826 can include multiple media (e.g., a centralized/distributed database and/or associated caches and servers) that store one or more sets of instructions 828. The machine-readable (storage) medium 826 can include any medium that is capable of storing, encoding, or carrying a set of instructions for execution by the computer system 800. The machine-readable medium 826 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 810, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 804, 808, 828) set at various times in various memory and storage devices in computing device(s). When read and executed by the processor 802, the instruction(s) cause the computer system 800 to perform operations to execute elements involving the various aspects of the disclosure.

Remarks

The terms "example," "embodiment," and "implementation" are used interchangeably. For example, reference to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the embodiments. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the examples, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the embodiments, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the embodiments disclosed herein should not be taken to imply that the terminology is being redefined herein to be restricted to any specific characteristics, features, or aspects of the embodiments disclosed herein with which that terminology is associated. In general, the terms used in the following examples should not be construed to limit the embodiments disclosed herein to the specific examples disclosed herein, unless the above Detailed Description explicitly defines such terms. Accordingly, the actual scope of the embodiments disclosed herein encompasses not only the disclosed examples, but also all equivalent ways of practicing or implementing the embodiments disclosed herein under the examples. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the embodiments disclosed herein can be modified to employ the systems, functions, and concepts of the various references described above to provide yet further implementations of the embodiments disclosed herein.

To reduce the number of claims, certain implementations are presented below in certain forms, but the applicant contemplates various aspects of the embodiments disclosed herein in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A computer system comprising:
   at least one hardware processor; and
   at least one non-transitory computer-readable storage medium storing instructions, which,
      when executed by the at least one hardware processor, cause the computer system to:
      receive at least one Wi-Fi probe request emitted by an electronic device, wherein the at least one Wi-Fi probe request includes multiple metadata fields;
      extract data values present in a subset of the multiple metadata fields,
         wherein the subset of the multiple metadata fields is determined to be indicative of a type of the electronic device based on training a machine learning model to identify, based on wireless signals emitted by other electronic devices, the other electronic devices;

determine that at least one metadata field of the subset of the multiple metadata fields is empty;

responsive to determining that the at least one metadata field is empty, insert a particular value into the at least one metadata field;

generate a feature vector based on the data values present in the subset of the multiple metadata fields and the particular value present in the at least one metadata field,
wherein the feature vector is indicative of the type of the electronic device;

determine, using the machine learning model, the type of the electronic device based on the feature vector; and send the type of the electronic device to a computer device.

2. The computer system of claim 1, wherein the at least one Wi-Fi probe request is received via a Wi-Fi receiver communicably coupled to the computer system.

3. The computer system of claim 1, wherein the type of the electronic device indicates that the electronic device is a smartphone.

4. The computer system of claim 1, wherein the type of the electronic device indicates that the electronic device is one of a computer, a tablet, a router, a gaming console, or an Internet of Things (IoT) device.

5. The computer system of claim 1, wherein the at least one Wi-Fi probe request indicates a media access control (MAC) address, a manufacturer of the electronic device, connection capabilities of the electronic device, and/or a data throughput rate of the electronic device.

6. The computer system of claim 1, wherein the type of the electronic device indicates a make and/or model of the electronic device.

7. The computer system of claim 1, wherein the machine learning model stores fingerprints of the other electronic devices, and
wherein the fingerprints comprise data extracted from the wireless signals.

8. A computer-implemented method for determining a type of an electronic device, the computer-implemented method comprising:

receiving at least one Wi-Fi probe request emitted by an electronic device, wherein the at least one Wi-Fi probe request includes multiple metadata fields;

extracting data values present in a subset of the multiple metadata fields, wherein the subset of the multiple metadata fields is determined to be indicative of a type of the electronic device based on training a machine learning model to identify, based on wireless signals emitted by other electronic devices, the other electronic devices;

determining that at least one metadata field of the subset of the multiple metadata fields is empty;

responsive to determining that the at least one metadata field is empty, inserting a particular value into the at least one metadata field;

generating a feature vector based on the data values present in the subset of the multiple metadata fields and the particular value present in the at least one metadata field, wherein the feature vector is indicative of the type of the electronic device;

determining, using the machine learning model, the type of the electronic device based on the feature vector; and sending the type of the electronic device to a computer device.

9. The computer-implemented method of claim 8, wherein the at least one Wi-Fi probe request is received via a Wi-Fi receiver.

10. The computer-implemented method of claim 8, wherein the type of the electronic device indicates that the electronic device is a smartphone.

11. The computer-implemented method of claim 8, wherein the type of the electronic device indicates that the electronic device is one of a computer, a tablet, a router, a gaming console, or an Internet of Things (IoT) device.

12. The computer-implemented method of claim 8, wherein the at least one Wi-Fi probe request indicates a media access control (MAC) address, a manufacturer of the electronic device, connection capabilities of the electronic device, and/or a data throughput rate of the electronic device.

13. The computer-implemented method of claim 8, wherein the type of the electronic device indicates a make and/or model of the electronic device.

14. The computer-implemented method of claim 8, wherein the machine learning model stores fingerprints of the other electronic devices and wherein the fingerprints comprise data extracted from the wireless signals.

15. A computer-readable media storing non-transitory computer executable instructions that when executed cause a computing system to perform the steps for determining a type of an electronic device, comprising:

receiving at least one Wi-Fi probe request emitted by an electronic device, wherein the at least one Wi-Fi probe request includes multiple metadata fields;

extracting data values present in a subset of the multiple metadata fields, wherein the subset of the multiple metadata fields is determined to be indicative of a type of the electronic device based on training a machine learning model to identify, based on wireless signals emitted by other electronic devices, the other electronic devices;

determining that at least one metadata field of the subset of the multiple metadata fields is empty;

responsive to determining that the at least one metadata field is empty, inserting a particular value into the at least one metadata field;

generating a feature vector based on the data values present in the subset of the multiple metadata fields and the particular value present in the at least one metadata field, wherein the feature vector is indicative of the type of the electronic device;

determining, using the machine learning model, the type of the electronic device based on the feature vector; and sending the type of the electronic device to a computer device.

16. The computer-readable media of claim 15, wherein the at least one Wi-Fi probe request is received via a Wi-Fi receiver communicably coupled to the computing system.

17. The computer-readable media of claim 15, wherein the type of the electronic device indicates that the electronic device is a smartphone.

18. The computer-readable media of claim 15, wherein the type of the electronic device indicates that the electronic device is one of a computer, a tablet, a router, a gaming console, or an Internet of Things (IoT) device.

19. The computer-readable media of claim 15, wherein the at least one Wi-Fi probe request indicates a media access control (MAC) address, a manufacturer of the electronic device, connection capabilities of the electronic device, and/or a data throughput rate of the electronic device.

20. The computer-readable media of claim 15, wherein the type of the electronic device indicates a make and/or model of the electronic device.

\* \* \* \* \*